United States Patent
Stirling et al.

(10) Patent No.: US 9,596,720 B2
(45) Date of Patent: Mar. 14, 2017

(54) INDUCTIVELY HEATED EXTRUDER HEATER

(71) Applicants: Ralph L. Stirling, College Place, WA (US); Luke Chilson, Hermiston, OR (US); Alex English, Walla Walla, WA (US)

(72) Inventors: Ralph L. Stirling, College Place, WA (US); Luke Chilson, Hermiston, OR (US); Alex English, Walla Walla, WA (US)

(73) Assignee: ProtoParadigm LLC, Hermiston, OR (US)

( * ) Notice: Subject to any disclaimer, the term of this patent is extended or adjusted under 35 U.S.C. 154(b) by 692 days.

(21) Appl. No.: 13/843,843

(22) Filed: Mar. 15, 2013

(65) Prior Publication Data

US 2014/0265037 A1 Sep. 18, 2014

(51) Int. Cl.
  *H05B 6/06* (2006.01)
  *B29C 35/08* (2006.01)
  *H05B 6/14* (2006.01)

(52) U.S. Cl.
  CPC ........... *H05B 6/06* (2013.01); *B29C 35/0805* (2013.01); *H05B 6/14* (2013.01); *B29C 2035/0816* (2013.01); *H05B 2206/023* (2013.01)

(58) Field of Classification Search
  CPC ..... B29C 2035/0816; B29C 2035/0811; B29C 35/0805; B29C 35/08; H05B 6/06; H05B 6/14; H05B 2206/023
  USPC ........ 425/317, 174, 174.8 R, 174.8 E, 174.6, 425/375, 113; 264/10, 402, 403, 404, 264/405, 308, 464, 472, 486, 487
  See application file for complete search history.

(56) References Cited

U.S. PATENT DOCUMENTS

| | | | |
|---|---|---|---|
| 4,256,945 A | 3/1981 | Carter et al. | |
| 4,640,742 A * | 2/1987 | Helleur | D21F 7/06 162/212 |
| 4,673,781 A | 6/1987 | Nuns et al. | |
| 5,003,145 A | 3/1991 | Nolle et al. | |
| 5,121,329 A | 6/1992 | Crump | |
| 5,506,607 A | 4/1996 | Sanders et al. | |
| 5,994,681 A | 11/1999 | Lloyd | |
| 6,238,613 B1 | 5/2001 | Batchelder et al. | |
| 7,022,951 B2 | 4/2006 | Larive et al. | |

(Continued)

OTHER PUBLICATIONS

Claims of U.S. Appl. No. 14/449,143, filed Jul. 31, 2014.*

(Continued)

*Primary Examiner* — Matthew Daniels
*Assistant Examiner* — Leith S Shafi

(57) ABSTRACT

One embodiment of a heated nozzle for extruding meltable material consists of an electrically conductive nozzle, comprised of an inlet, an outlet, and a passage connecting inlet and outlet. The nozzle fits into a hole or gap cut or formed through a loop of high permeability soft magnetic material such as ferrite or pressed iron powder. Electrically conductive wire is coiled around and through this magnetic loop to form a coil. A high-frequency alternating current is supplied to the coil, inducing a magnetic field in the magnetic core. The magnetic field, when passing through the electrically conductive nozzle, induces eddy currents that heat the nozzle to melt the material entering the inlet.

18 Claims, 8 Drawing Sheets

(56) References Cited

U.S. PATENT DOCUMENTS

| | | | |
|---|---|---|---|
| 7,041,944 B2* | 5/2006 | Pilavdzic | B29C 45/74 219/601 |
| 7,194,885 B2 | 3/2007 | Hawkes | |
| 7,323,667 B2 | 1/2008 | Dooley | |
| 7,942,987 B2 | 5/2011 | Crump et al. | |
| 8,177,348 B2 | 5/2012 | Sidhu et al. | |
| 2005/0259507 A1* | 11/2005 | Ronkin | B22D 19/0072 366/69 |
| 2006/0219709 A1* | 10/2006 | Kagan | H05B 6/04 219/661 |
| 2012/0070523 A1 | 3/2012 | Swanson et al. | |
| 2012/0092724 A1* | 4/2012 | Pettis | B29C 67/0055 358/1.15 |

OTHER PUBLICATIONS

Jacob Bayless, "Induction Heating Extruder", http://www.ubc-rapid.com/wiki/index.php?title=Induction_Heating_Extruder , Mar. 2012.
http://reprap.org/wiki/Arcol.hu_Hot-End_Version_4 , Jan. 2013.
Joergen, http://umforum.ultimaker.com/index.php?/topic/131-new-hot-end-design/, Dec. 2011.

* cited by examiner

INDUCTIVELY HEATED EXTRUDER HEATER

BACKGROUND

Prior Art

The following is a tabulation of some prior art that presently appears relevant:

U.S. Patents

| Pat. No. | Kind Code | Issue Date | Patentee |
|---|---|---|---|
| 4,256,945 | B1 | Mar. 17, 1981 | Philip S. Carter |
| 5,003,145 | B1 | Mar. 26, 1991 | Eugen Nolle et al. |
| 7,942,987 | B1 | May 17, 2011 | S. Scott Crump et al. |
| 5,121,329 | B1 | Jun. 9, 1992 | S. Scott Crump |
| 6,238,613 | B1 | May 29, 2001 | John S. Batchelder |
| 6,142,207 | B1 | Nov. 7, 2000 | Francis Richardot |
| 7,194,885 | B1 | Mar. 27, 2007 | Daniel J. Hawkes |

U.S. Patent Application Publications

| Publication Number | Kind Code | Publ. Date | Applicant |
|---|---|---|---|
| 20120070523 | A1 | Sep. 22, 2012 | Swanson et al. |

Foreign Patent Documents

| Foreign Doc. Nr. | Cntry Code | Kind Code | Pub. Date | App or Patentee |
|---|---|---|---|---|
| 2156715 | EP | B1 | May 2, 2012 | Mcdonald |

Non-Patent Literature Documents

Jacob Bayless, UBC-Rapid.com, "Induction Heating Extruder", March 2012

Reprap.org, "Arcol.hu Hot End Version 4", January 2013

One class of 3-D printers or additive manufacturing systems uses thermoplastic filament or rod heated to a softened, molten, or liquid state and extruded through a small hole in a nozzle to build up a part or model. The extruder nozzle is moved relative to a platform, under computer control, to lay down a bead of the thermoplastic on the platform as a feeder mechanism pushes the filament or rod into the extruder heater. The computer interprets a file of movement instructions to drive three axes of motion while starting and stopping the flow of heated plastic. The part or model is built up layer by layer on the platform.

Prior art heater designs for 3-D printers fall into two categories. The vast majority of filament-type 3-D printers use simple resistance heaters wrapped around or encased in a metal nozzle or heating body (often simply called the "hot end"). The resistance heating element is supplied with direct current or line-frequency (50 or 60 Hz) alternating current, turned on and off by an electronic or mechanical thermostat device to maintain proper temperature. The heating body assembly must be physically large to accommodate a suitably high-wattage resistance heater element. The heater/nozzle assembly is wrapped in insulation to prevent other components in the printer from overheating. The Stratasys U.S. published patent application 2012/0070523 is typical of this approach. Another typical resistively heated extruder nozzle assembly is the Arcol unit.

Resistance heated extruders are by nature relatively heavy. We have found that the weight of the extruder heater, the large heated zone and the slow response time to temperature set point changes are major limitations on the speed and accuracy of current 3-D printers.

If the temperature sensor, thermostatic device, or control circuit in a prior art conventional resistive extruder heater fails, we have observed that the heater may overheat or even catch fire. Extra circuitry is needed to detect heater control failure.

A few printer designs have used or proposed to use an induction heating method (also sometimes called "eddy current heating"). Conventional induction heaters consist of a helical coil of wire surrounding an electrically conductive metal heating block. An oscillator creates a high-frequency alternating current that is applied to the wire coil. The magnetic field created by this current couples to the metal heating block, which heats up due to eddy currents in its internal resistance. We have determined that the magnetic field may also radiate all around the outside of the coil of wire, causing electromagnetic interference and undesired heating of nearby metallic objects. The plastic filament to be melted is fed into an orifice in the heater block. Because the heater block is entirely surrounded by the wire coil, it is difficult to make direct temperature measurements of the heater block so as to properly control the melt temperature. A thermocouple, resistive temperature device, or thermostat placed on the heater block inside the straight-line coil will experience eddy current and hysteresis heating itself, causing errors in temperature measurement. If the heater block is extended far enough beyond the ends of the coil to provide a measurement location not adversely affected by the magnetic field of the straight-line coil, the temperature measured will not accurately reflect the temperature at the center of the heater block where the plastic filament is melted.

Resistance heaters and straight-coil induction heaters are also the current state of technology in hot-glue adhesive dispensers, both manual hand-operated dispensers and industrial automatic dispensers. We have observed that the large heater blocks necessitated by resistance heating make it difficult to regulate the temperature at the nozzle tip. We have found that heating is slow, and cooling is also slow, leading to dripping of adhesive after the dispenser is turned off.

We have also observed that the large, hot blocks of metal in conventional resistance heaters in 3-D printers and adhesive dispensers are hazardous to operators because of the large area of exposed nozzle and their long cool-down time after power is removed.

SUMMARY

One embodiment of our inductively heated extruder heater or adhesive dispenser uses an electrically conductive nozzle of minimal size, with an inlet orifice and an outlet orifice connected by a passage, inserted into a gap or hole through a magnetic core formed in the shape of a loop. A high-frequency magnetic field is created in the core by a helical coil of wire wrapped through the center and around the core and connected to a source of high-frequency alternating current. The high-frequency magnetic field in the core gap induces eddy currents in the metal nozzle, rapidly heating it to the melting temperature of the filament or feedstock to be extruded. Another embodiment uses a ferrous material for the nozzle. The magnetic field will cause heating of the nozzle from both eddy current losses due to the electrical conductivity, and hysteresis losses due to the magnetic properties of the ferrous material.

The soft magnetic core material is selected to have a Curie temperature below the maximum safe operating temperature of the extruder or dispenser.

Advantages

Because there is no excess mass in the inductively heated nozzle of an embodiment of our extruder heater, the time to heat up and cool down is very short, and the power required is much lower than conventional resistively heated extruders or dispensers. In 3-D printers using prior art extruder heaters, we have observed that the slow rate of heating and cooling causes the melted plastic to begin to flow after the extruder head or build platform has begun to move, and continues to flow after the motion has ceased. This lag causes inaccuracies in the parts printed with prior art extruder heaters.

In addition, the combined mass of the nozzle, magnetic core, and wire in the present invention is much lower than prior art conventional resistive extruder heaters, allowing much higher acceleration of a print head for higher 3-D printing speeds.

The Curie temperature property of the magnetic core material, selected below the maximum safe operating temperature of the extruder or dispenser makes an embodiment of the heater passively safe in the event of temperature sensor or control circuit failure. No extra circuitry is needed to monitor the temperature sensor or controller.

In one embodiment, the small mass of the inductively heated nozzle cools off quickly when the high-frequency alternating current is removed, eliminating the dripping and oozing problems we have observed with conventional 3-D printer extruders and adhesive dispensers. Conventional extruders must pull back the filament to prevent dripping or oozing, which adds mechanical complexity and undesirable changes in plastic properties. The present invention can be handled by operators much sooner after turning off, with reduced danger of burns.

Because the magnetic field induced by the coil is concentrated by the magnetic core onto two small areas on either side of the nozzle heating body, in one embodiment, there are areas not within the magnetic field for easy measurement of the nozzle temperature. Thermocouples or resistive temperature devices attached to the nozzle in these areas outside of the magnetic field region will not experience eddy current or hysteresis heating effects, and thus will provide an accurate indication of the temperature inside the nozzle. Because the nozzle heating body can be made very small, the temperature at the surface being measured will also be very close to the temperature inside the nozzle.

The inductively heated nozzle in one embodiment has such a small surface area that only a small amount of thermal insulation is required to protect the operator of the 3-D printer or adhesive dispenser and keep the temperature of adjacent components of a 3-D printer cool, reducing the size and cost.

DRAWINGS

Figures

Figure 2A:
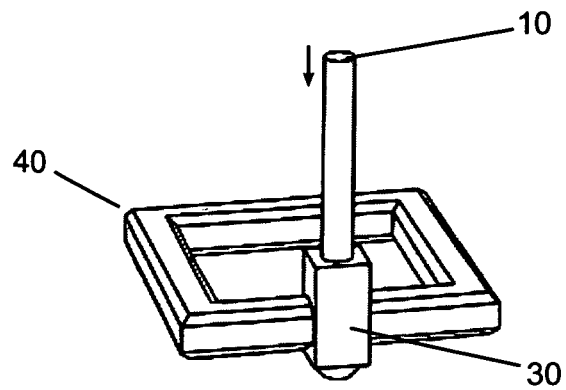
Figure 2B:
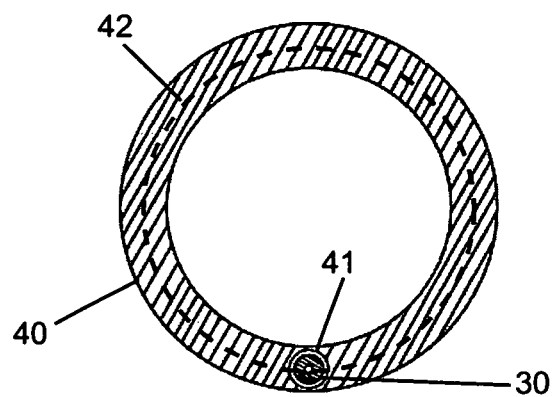
Figure 2C:
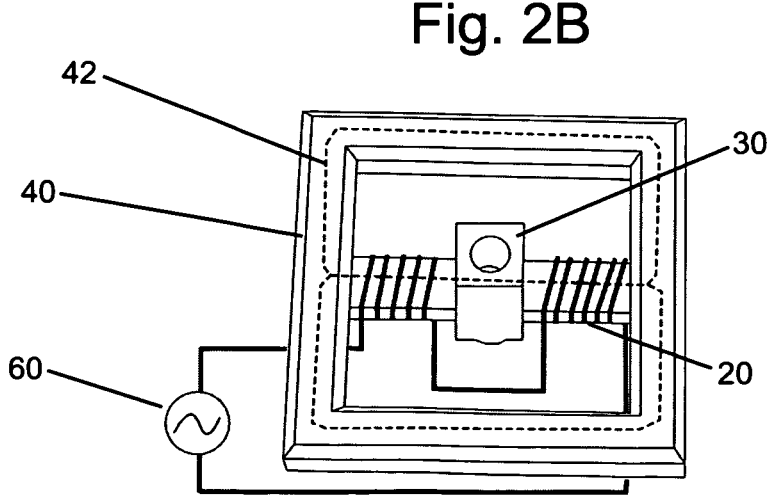

FIGS. 2A, 2B, and 2C show embodiments illustrating different shaped magnetic cores.

Figure 3A:
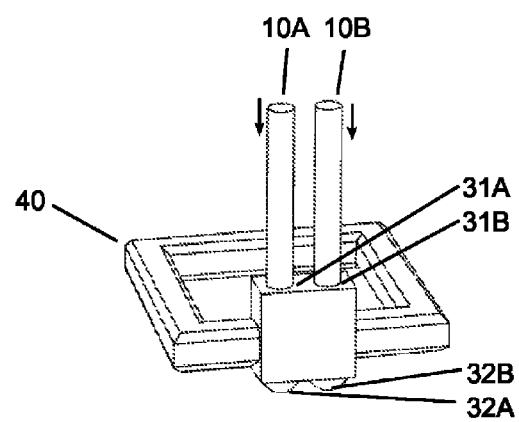
Figure 3B:
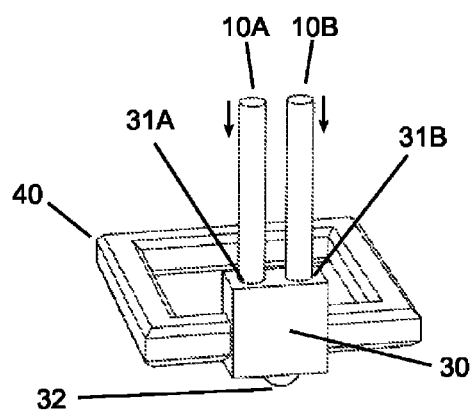
Figure 3C:
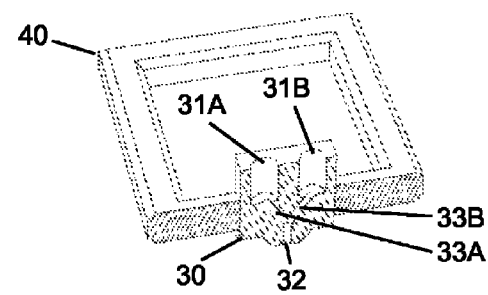

FIGS. 3A, 3B and 3C show embodiments illustrating different nozzle orifices.

Figure 4:
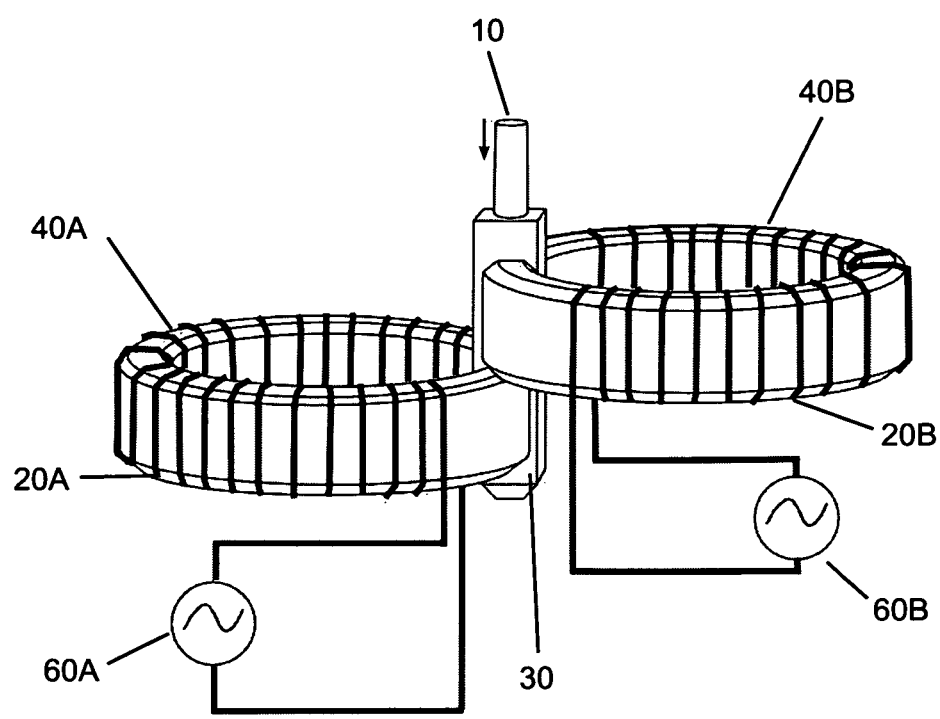

FIG. 4 shows a dual heat zone embodiment.

Figure 5A:
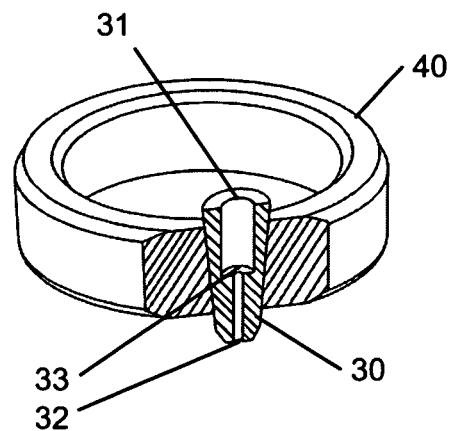
Figure 5B:
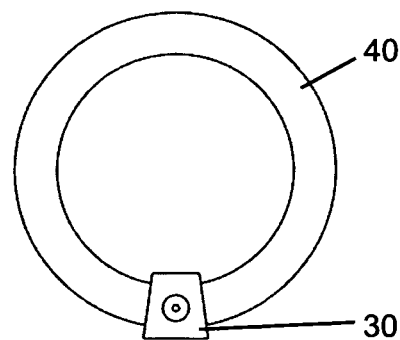

FIGS. 5A and 5B show cross-sectional views illustrating tapered nozzle embodiments.

Figure 6:
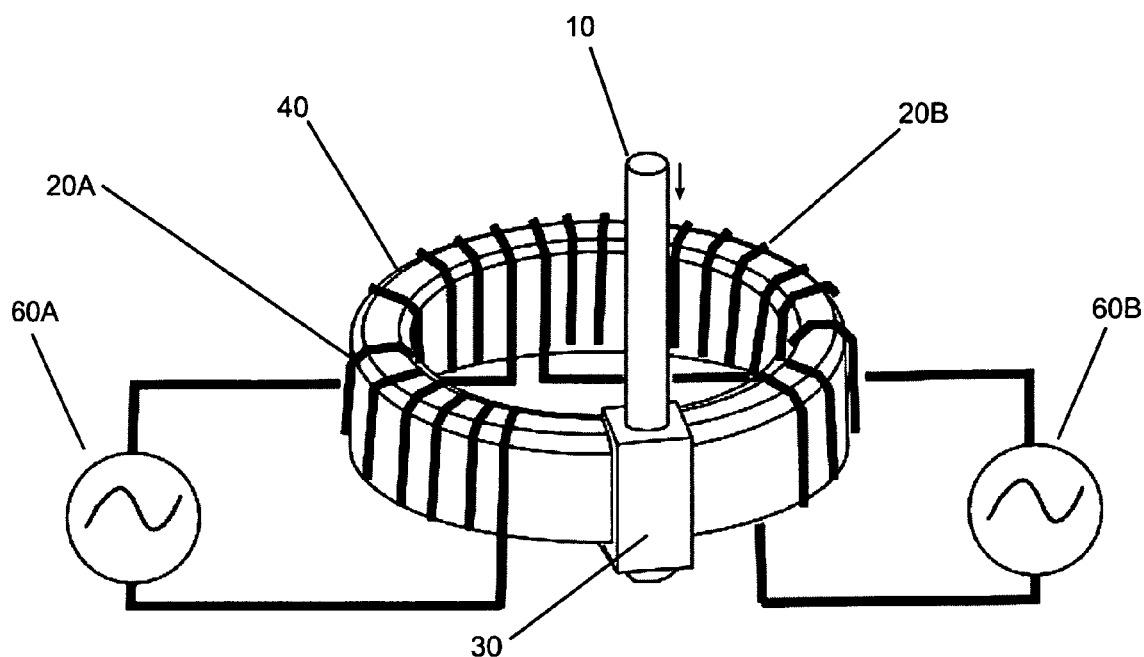

FIG. 6 shows a dual wire coil embodiment.

Figure 7A:
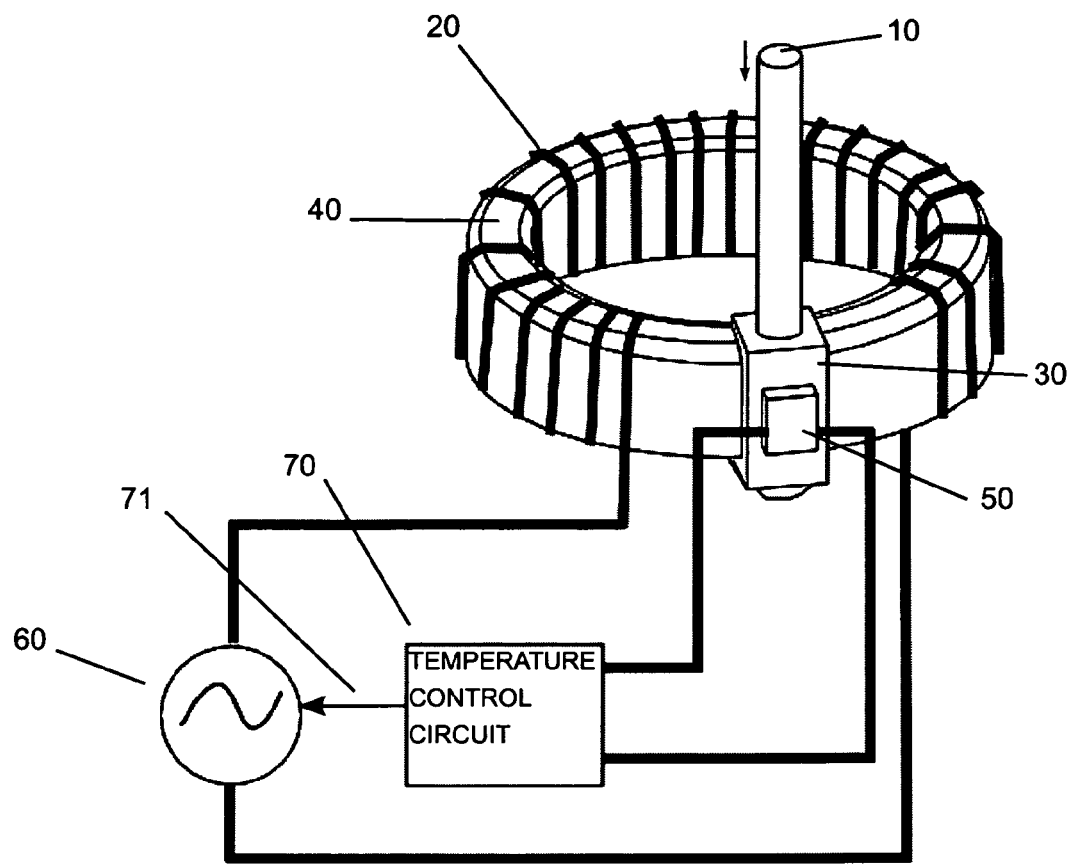
Figure 7B:
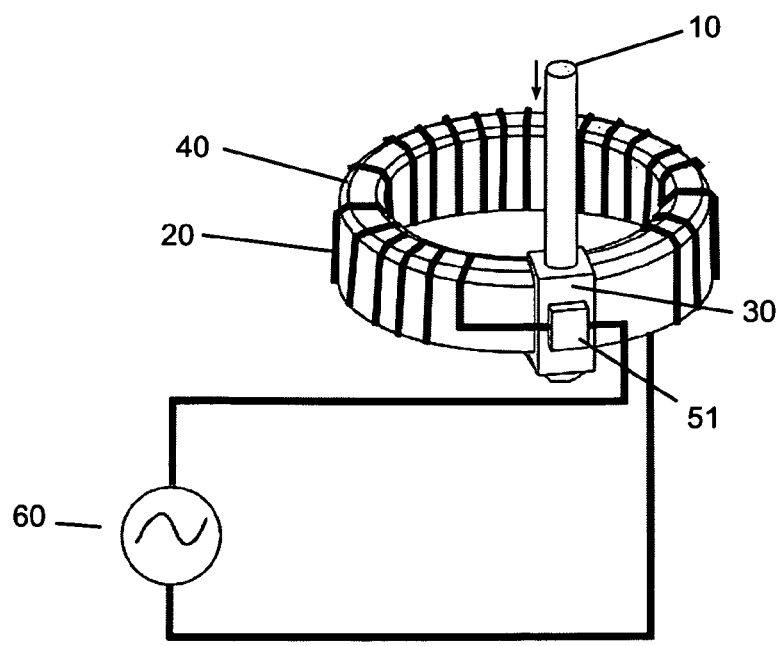

FIGS. 7A and 7B show embodiments incorporating temperature sensing and control.

Figure 8:
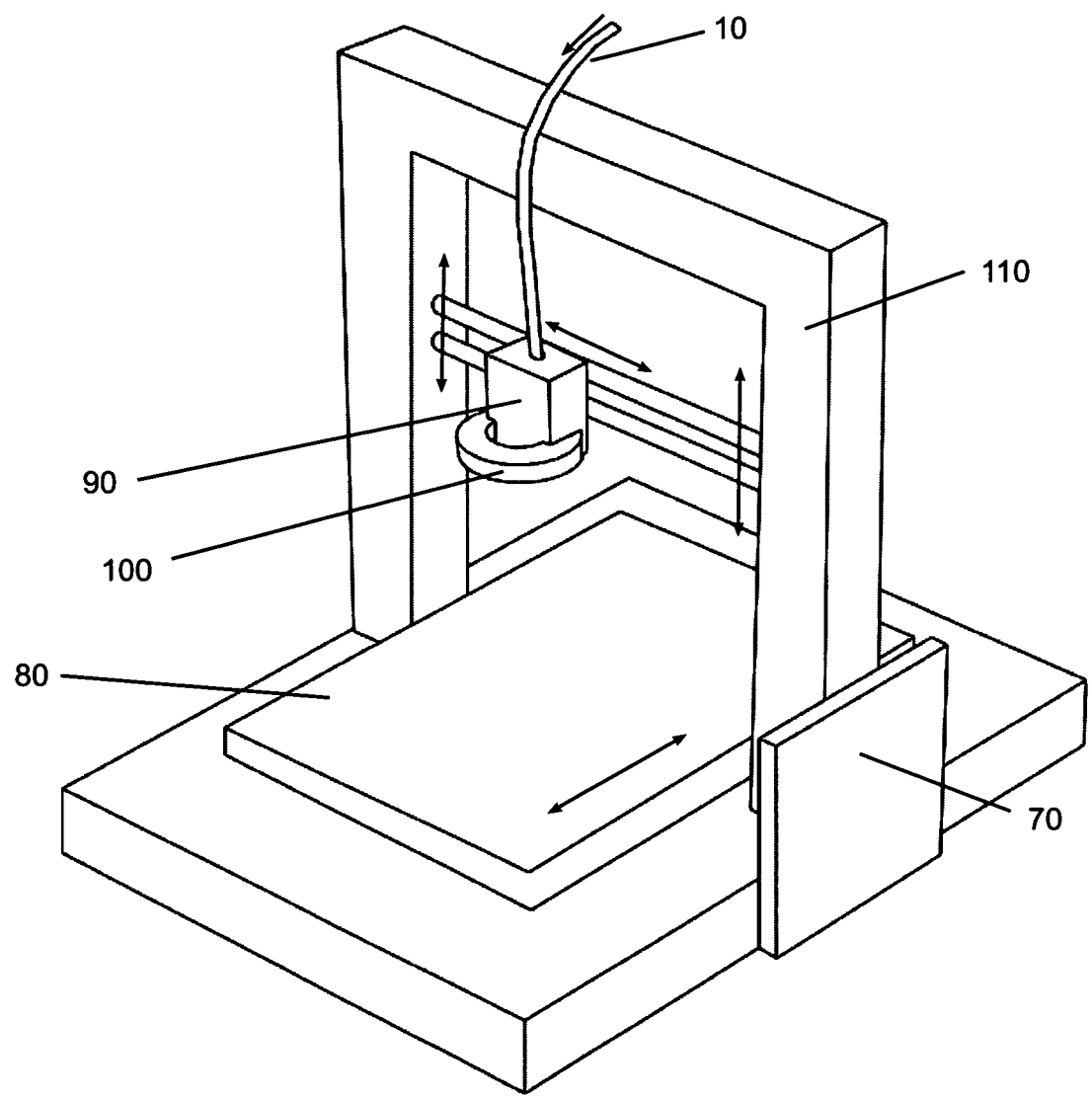

FIG. 8 shows one embodiment in a 3-D printer.

DRAWINGS

Reference Numerals

10—filament, rod or other feedstock, omitted in some figures for clarity
20—insulated wire coil or coils, omitted in some figures for clarity
30—electrically and thermally conductive nozzle or nozzles
31—inlet orifice or orifices
32—outlet orifice or orifices
33—passage or passages, omitted in some figures for clarity
34—heat sink flange present in some embodiments
40—magnetic non-conductive core
41—air gap present in some embodiments
42—path of magnetic flux in magnetic core and nozzle
50—temperature sensor, omitted in some figures for clarity
51—thermostat, omitted in some figures for clarity
60—high-frequency alternating current source, omitted in some figures for clarity
70—temperature control circuit, omitted in some figures for clarity
71—signal from temperature control circuit to alternating current source

DETAILED DESCRIPTION

First Embodiment

Figure 1A:
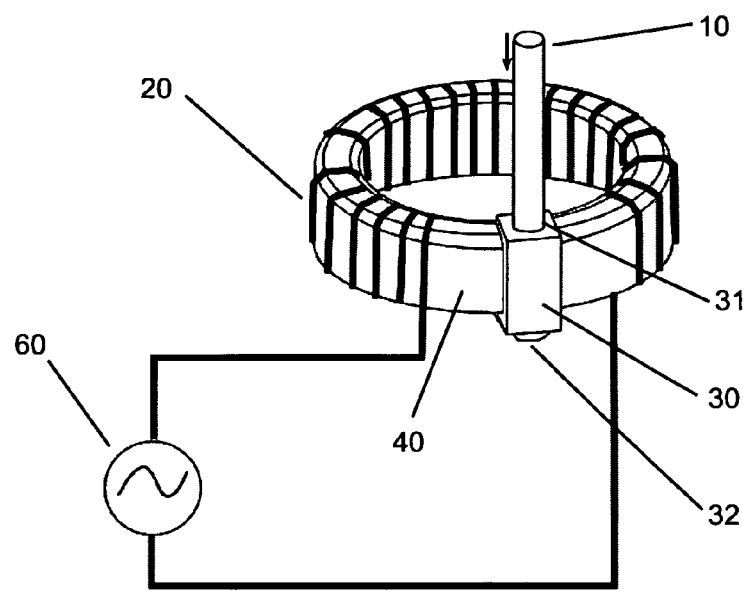
FIGS. 1A and 1B show embodiments illustrating different nozzle shapes.
Figure 1B:
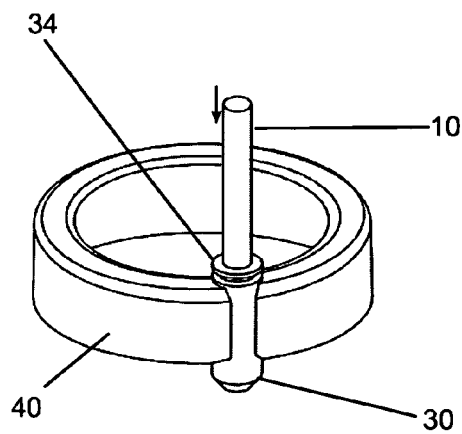
Figure 1C:
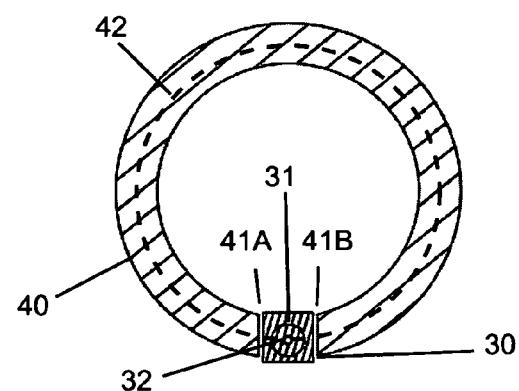
FIG. 1C is a cross-sectional view of the first embodiment.

FIGS. 1A, 1B and 1C

The embodiment shown in FIGS. 1A to 1C is an inductively heated extruder heater. The nozzle 30 consists of a heating body made of an electrically and thermally conductive material, such as steel, with an inlet orifice 31 and an outlet orifice 32. The inlets and outlets are connected by a passage 33 (not visible in FIGS. 1A-1C). The nozzle 30 fits into a hole or gap cut or formed through a loop of high-permeability soft magnetic material such as ferrite or pressed iron powder, forming a core 40.

Electrically conductive wire is coiled around and through this loop to form one or more coils 20. An high-frequency alternating current source 60 applies a high-frequency alternating current to the wire coil or coils 20. There may optionally be small air gaps 41A and 41B present between the nozzle 30 and the magnetic core 40.

A filament, rod, wire or other feedstock 10 of meltable or flowable material is introduced to inlet orifice 31 when the nozzle 30 has reached operating temperature. The force required to push feedstock 10 into the extruder heater is provided by external mechanisms. The melted material exits outlet orifice 32 after traveling through the passage 33 (not visible in FIGS. 1A-1C).

Operation—FIGS. 1A, 1B, and 1C Embodiment

The high-frequency alternating current flowing in the wire coil or coils 20 creates a strong magnetic field within the core 40 of high-permeability material, around path 42. Because it is a closed loop, the magnetic field is nearly all contained within the loop. Very little electromagnetic radiation leaks from the coil to cause interference to nearby electronics or radio devices, a problem we have observed with prior art inductive heater designs. Ferrite, iron powder and other known magnetic core materials exhibit only very small internal energy losses, because the magnetic particles are very small and insulated from each other by extremely thin layers of non-magnetic, non-conductive material. The conductive nozzle 30 inserted into the loop, however, will have high losses (in the form of heat) from eddy currents created by the magnetic field. In the case of nozzles 30 formed from ferrous materials, additional heating takes place from hysteresis losses. These losses are used by this embodiment to melt the filament, rod, or other feedstock 10 to be extruded. The loop of magnetic material forming core 40 will often be in the general shape of a toroid, although other shapes can also work, as long as they form a closed magnetic circuit.

In some embodiments, there will be present air gaps 41A and 41B, either due to manufacturing variations in the core 40 or the nozzle 30, or by design. The air gaps 41A and 41B will lower the permeability and increase the reluctance of the magnetic circuit through core 40 and nozzle 30. A higher alternating current amplitude from alternating current source 60 or more turns of wire in coil 20 will maintain a sufficiently high magnetic field to heat nozzle 30 to the desired temperature.

Non-magnetic nozzle materials that could work in some embodiments might include tungsten, graphite, copper, or aluminum. Additional electrically and thermally conductive materials are possible.

In some embodiments, a flange 34 is formed at the top of nozzle 30 to reduce the flow of heat up the filament 10. The flange 34, if present, will radiate some of the heat flowing up the filament 10 by conduction, keeping down the temperature of filament 10 before it enters inlet orifice 31. The flange 34 could also be formed near the outlet orifice 31 to cool the molten material as it exits. Flange 34 could also be formed elsewhere on nozzle 30 to provide selective or localized cooling as desired.

Description—Additional Embodiments—FIGS. 2-6

A circular toroidal shape of core is not the only possible configuration. FIG. 2A shows a rectangular shaped magnetic core 40. Any shape is possible, as long as it forms a continuous magnetic circuit. The soft magnetic material can be made in bulk and cut to the desired shape, or can be pressed, molded, or sintered in the final shape. The magnetic core 40 could be fabricated in segments and fused or held together by high temperature adhesives or mechanical methods. The nozzle 30 may be inserted in a hole in core 40 that does not completely sever the core. FIG. 2B is a cross-section illustrating such an embodiment. FIG. 2C shows an embodiment with a more complicated magnetic circuit. There is still a continuous magnetic path 42 through core 40 and nozzle 30. Magnetic flux, created by the high frequency current from source 60 flowing in coil 20 will substantially follow magnetic path 42 to heat nozzle 30 by induced eddy currents.

The nozzle 30 must have at least one inlet orifice 31 and one outlet orifice 32 to extrude feedstock material 10. FIG. 3A illustrates an embodiment with two inlet orifices 31A and 31B and two outlet orifices 32A and 32B with two separate passages 33A and 33B to extrude two beads of material simultaneously and independently. Two inlets 31A and 31B and one outlet 32, connected by passages 33A and 33B, shown in FIGS. 3B and 3C, embody a blending arrangement to extrude one bead from two feedstock filaments 10A and 10B. Passages 33A and 33B can take different forms in different embodiments, or be combined into one mixing chamber, to achieve specific mixing characteristics. In another embodiment represented by FIG. 3B and FIG. 3C two different feedstocks 10A and 10B are alternately fed into inlets 31A and 31B, such that only one at a time is extruded from outlet orifice 32. FIG. 3C is a cutaway view of FIG. 3B making passages 33A and 33B visible.

Multiple magnetic cores 40A and 40B can share a common nozzle 30 for purposes of multi-zone heating. FIG. 4 illustrates such an embodiment. This is advantageous for feedstock materials 10 that require a preheating step to alter some material properties, such as viscosity or moisture content, before final melting. Multiple cores 40A and 40B may also provide faster heating response time. Core 40A will be wrapped with coil 20A and connected to high-frequency alternating current source 60A. Core 40B will be wrapped with coil 20B and connected to high frequency alternating current source 60B, which could have a different amplitude or frequency than source 60A. Coil 20B could have a different number of turns than coil 20A, and core 40B could have a different Curie temperature than core 40A.

In one embodiment, the air gaps 41A and 41B due to dimensional variations that could occur in manufacturing magnetic core 40 and nozzle 30 are eliminated by forming the nozzle 30 and the gap in core 40 with matching tapers, as shown in FIGS. 5A and 5B. Variability of magnetic field from heater assembly to heater assembly during manufacturing may be reduced with air gaps 41A and 41B eliminated.

Another embodiment, FIG. 6, has more than one coil of wire. Two coils 20A and 20B may permit a two-phase alternating current drive circuit 60A and 60B with fewer components than a typical single-phase circuit. Three coils could permit a three-phase alternating current drive circuit, which may have some efficiency benefits. Embodiments with additional coils are possible. An embodiment with a single coil with a center-tap may permit simplified drive electronics, equivalent to the two-coil circuit illustrated in FIG. 6.

Description—Additional Embodiments—FIG. 7A

One embodiment includes a temperature sensor 50, such as a thermocouple, resistive temperature device, or thermistor, to measure the temperature of the nozzle 30, and communicate that temperature to a control circuit 70, which controls the alternating current source 60 by signal 71.

Operation—FIG. 7A Embodiment

In the embodiment of FIG. 7A, the alternating current source 60 has adjustable frequency or amplitude. The adjustment is performed by signal 71 from temperature control circuit 70 in response to changes in the temperature of nozzle 30 as measured by sensor 50. A person skilled in the art is familiar with suitable temperature control circuits. The magnetic field strength in magnetic core 40 is directly related to and controlled by the amplitude and frequency of the alternating current in coil 20.

Description and Operation—FIG. 7B Embodiment

Another embodiment uses a thermostatic device 51 in contact with the nozzle 30 to turn the alternating current on and off in coil 20 to control the temperature in nozzle 30. The thermostat 51 may either disconnect the supply of high-frequency alternating current to the coil 20, as shown in FIG.

7B, or it may alternatively disconnect the power source to the alternating current source 60.

Operation—FIGS. 7A and 7B Embodiments

The magnetic permeability of ferrite and iron powder materials varies somewhat with temperature. As the temperature of the material rises, it eventually reaches a point called the Curie temperature. Above the Curie temperature, the permeability drops to negligible levels. This causes the magnetic field to also drop to very low levels. A thin layer of the soft magnetic core that is in contact with the nozzle will heat up to the temperature of the nozzle by thermal conduction. When this exceeds the Curie temperature, the permeability of this thin layer will drop. The magnetic field will then drop, reducing the eddy current and hysteresis losses that are heating the nozzle. Inductive heaters for soldering irons have used this property to regulate the temperature of their heating elements. In the embodiments shown in FIGS. 7A and 7B, the Curie temperature is used as a safety measure. If the control circuitry 70 or sensor 50 or thermostat 51 malfunctions, the magnetic core 40 temperature cannot exceed the Curie temperature because the magnetic field in magnetic core 40 will drop, lowering the eddy and hysteresis currents in nozzle 30, which will lower the temperature in nozzle 30 to a temperature close to the Curie temperature of core 40. Choosing a core material with a Curie temperature lower than the maximum safe temperature of the heater assembly and feedstock material makes this embodiment passively safe from overheating or fire, which we have found to be a serious problem with prior art extruder heaters.

Description and Operation—FIG. 8 Embodiment

A 3-D printer or additive manufacturing system may consist of a build bed 80, where the part is printed or formed, layer by layer, the filament feeder 90, the extruder heater 100, and a mechanism 110 to move the extruder relative to the build bed 80. A control circuit 70 actuates the movement of the extruder relative to the build bed 80, the temperature of the extruder 100, and the feed rate of the filament feeder 90. The smaller the extruder heater 100 the smaller the printer can be, and the lighter the extruder heater 100, the faster extruder heater 100 can be moved relative to the build bed 80. The smaller the mass being heated in the extruder 100, the faster the filament feed rate can be changed. Printing a 3-D part requires the filament feed to be started and stopped many times for each layer deposited. Our inductive extruder heater focuses the heating energy to the smallest possible mass in the nozzle, permitting much faster operation than prior art 3-D printers. Because the heating body in some embodiments of our extruder heater is very small, with a very short passage for the filament 10 to pass through, much less force is required to push the filament 10 into and through the nozzle (not shown in this FIG. 8). Less force required permits smaller feed mechanisms than necessary for prior art extruder heaters.

We have found it desirable to have multiple filament feeders 90 and extruder heaters 100 in 3-D printers, permitting a part to be formed with more than one color or type of plastic filament 10. Prior art extruders were too heavy and bulky to permit multiple filaments in a compact printer. An embodiment of our extruder heater is small enough that multiple extruders can be easily installed in even very compact 3-D printers.

CONCLUSION, RAMIFICATIONS, AND SCOPE

Accordingly, at least one embodiment of this inductively heated extruder heater is much lighter, more compact, and more energy efficient than conventional extruder heaters, reaches operating temperature in far less time, and responds to temperature set point changes much quicker, while possessing inherent safety not present in prior art extruder heaters. The material costs to produce this design are lower than conventional resistance heaters, and the components are well suited to low-cost, automated manufacturing.

Despite the specific details present in our descriptions above, these should not be construed as limitations on the scope. Rather they serve as exemplification of several embodiments. Many other variations are possible. For example, the tapered nozzle may be used with either circular or non-circular soft magnetic cores. The inlet and outlet orifices in the nozzle do not have to be concentric. The nozzle does not need to be positioned perpendicular to the plane of the toroidal core. The nozzle may be inserted into a hole through the core, without the core being completely severed. The wire used in the coil may be of round or rectangular cross-section, and may have any type of insulation between turns, including air, that is compatible with the operating temperatures. The shape and size of the inlet and outlet orifices may be adjusted to suit the materials being extruded. Instead of filament or rod feedstock, a tube may deliver granular or viscous material to the heater, which will be melted or heated to a reduced viscosity condition before exiting the outlet. The soft magnetic core may have a complex three-dimensional shape, resulting in a magnetic path that does not lie in a plane. The heat sink flange, if present, may be in many different forms and shapes, as needed, to radiate heat away from the feedstock.

Accordingly, the scope should be determined not by the embodiments illustrated, but by the appended claims and their legal equivalents.

We claim:

1. A device for heating a feedstock of meltable or flowable material, comprising:
    a) a heating body of electrically conductive material, with one or more inlet orifices where said feedstock is introduced, and one or more outlet orifices for said feedstock to exit after being heated, with one or more passages or mixing chambers connecting said inlet orifices and outlet orifices, comprising a nozzle, and
    b) said nozzle sandwiched between the two ends of, or inserted through a hole or gap in, a continuous or segmented core of material having high magnetic permeability but low electrical conductivity, forming a complete magnetic loop, said nozzle fit in a gap in the magnetic loop, wherein the magnetic loop is oriented in a plane not substantially parallel with said nozzle, said core configured to support a loop or loops of magnetic flux lines of temporal alternating amplitude such that at least a portion of said temporal alternating magnetic flux lines interact with said nozzle resulting in heating of said nozzle due to eddy current effects, said core having at least some thermal conduction from said nozzle to said core, said eddy current heating limited by the Curie temperature property of material of said core, and
    c) one or more coils of electrically conductive wire passing through the center of said loop and around the outside of said loop, and
    d) one or more sources of high frequency alternating current connected to said coil or coils, inducing said magnetic flux lines and said eddy currents.

2. The device of claim 1 where said core is made of ferrite.

3. The device of claim 1 where said core is made of pressed iron powder.

4. The device of claim 1 where said heating body is made of steel.

5. The device of claim 1 where said heating body is tapered, and said core has a matching tapered gap or hole, such that no air gap exists between said heating body and said core.

6. The device of claim 1 where said feedstock is thermoplastic.

7. The device of claim 1 where said feedstock is aluminum.

8. The device of claim 1 where a flange or flanges comprising a heat sink are formed near said inlet orifice or said outlet orifice of said heating body.

9. The device of claim 2, where said feedstock is thermoplastic and said heating body is steel.

10. The device of claim 2, where said feedstock is aluminum and said heating body is steel.

11. A device for heating a feedstock of meltable or flowable material, comprising:
   a) a heating body of electrically conductive material, with one or more inlet orifices where said feedstock is introduced, and one or more outlet orifices for said feedstock to exit after being heated, with one or more passages or mixing chambers connecting said inlet orifices and outlet orifices, comprising a nozzle, and
   b) said nozzle sandwiched between the two ends of a continuous or segmented core of high magnetic permeability but low electrical conductivity, forming a complete magnetic loop at one point on said nozzle, and said nozzle fit in a gap in the magnetic loop, wherein the magnetic loop is oriented in a plane not substantially parallel with said nozzle said core configured to support a loop or loops of magnetic flux lines of temporal alternating amplitude such that at least a portion of said temporal alternating magnetic flux lines interact with said nozzle resulting in heating of said nozzle due to eddy current effects, said core having at least some thermal conduction from said nozzle to said core, said eddy current heating limited by the Curie temperature property of material of said core and one or more similar cores of magnetic material at additional points, to form additional heating zones in said heating body, and
   c) a first coil of electrically conductive wire passing through the center of said first core and around the outside of said first core, and similar coils around said additional cores, and
   d) a first source of high frequency alternating current connected to said first coil, and similar sources connected to each said additional coils, inducing said magnetic flux lines in said cores and said eddy currents in said nozzle.

12. The device of claim 11, where said heating body is made of steel.

13. The device of claim 11, where said core is made of ferrite.

14. The device of claim 11, where said core is made of pressed powdered iron.

15. a device for melting and extruding filament or rod in a 3-D printer or other additive manufacturing system, comprising:
   a) a heating body of electrically conductive material, with one or more inlet orifices, where a feedstock of meltable material is introduced, and one or more outlet orifices for said feedstock to exit after being heated, connected by one or more passages or mixing chambers, comprising a nozzle, and
   b) said nozzle sandwiched between the two ends of, or inserted through a hole or gap in, a continuous or segmented core of material having high magnetic permeability but low electrical conductivity, forming a complete magnetic loop, and said nozzle fit in a gap in the magnetic loop, wherein the magnetic loop is oriented in a plane not substantially parallel with said nozzle said core configured to support a loop or loops of magnetic flux lines of temporal alternating amplitude such that at least a portion of said temporal alternating magnetic flux lines interact with said nozzle resulting in heating of said nozzle due to eddy current effects, said core having at least some thermal conduction from said nozzle to said core, said eddy current heating limited by the Curie temperature property of material of said core and
   c) a coil of electrically conductive wire passing through the center of said core, and around the outside of said core, and
   d) a source of high frequency alternating current connected to said coil, inducing said magnetic flux lines and said eddy currents.

16. The device of claim 15, where said feedstock is thermoplastic.

17. The device of claim 15, where said feedstock is metal.

18. The device of claim 17, where said metal is aluminum.

* * * * *